July 23, 1929.    W. L. BASS    1,721,506
CONVERTIBLE LIQUID CONTAINER
Filed April 20, 1926
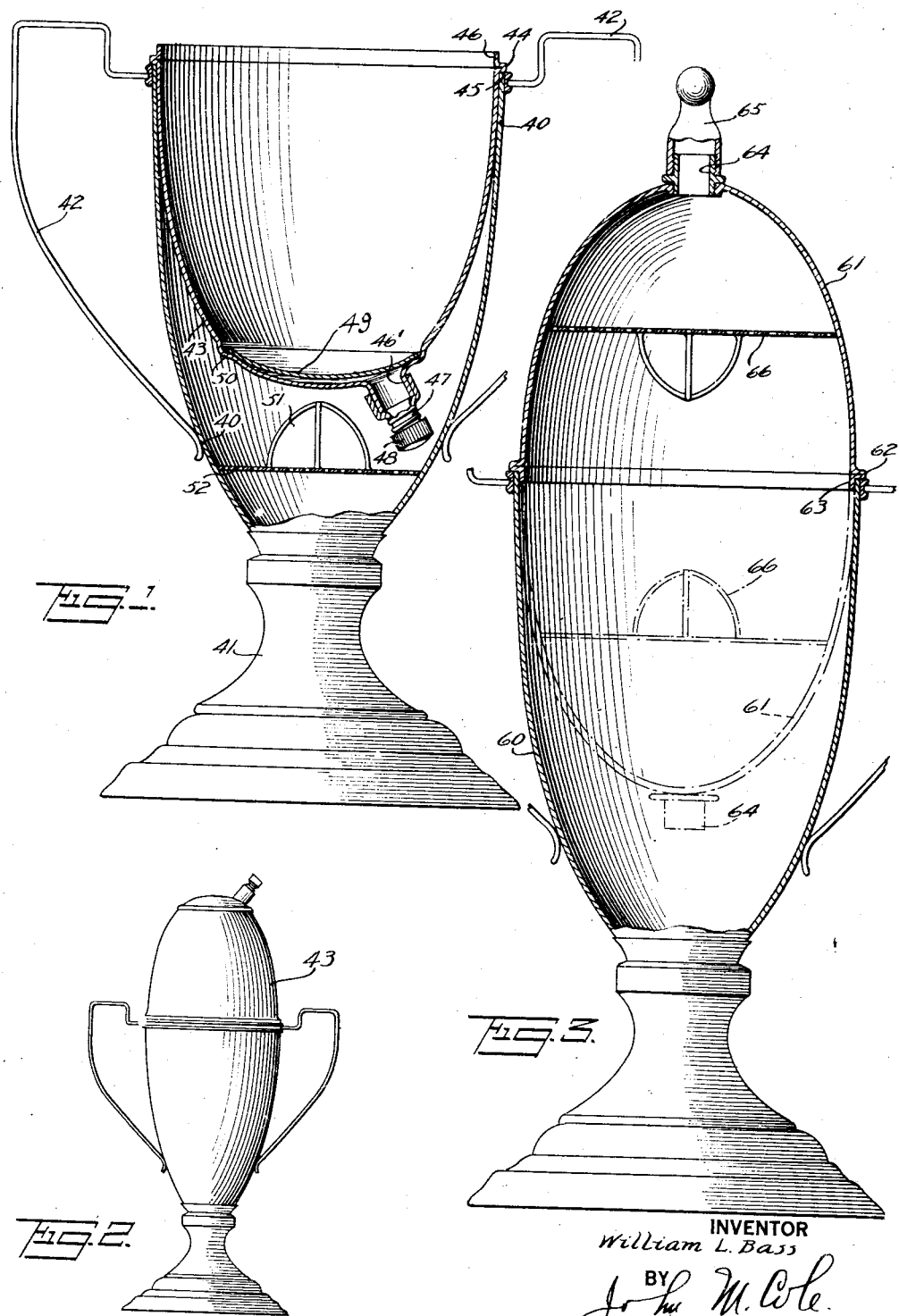
INVENTOR
William L. Bass
BY John M. Cole
ATTORNEY Patented July 23, 1929.

1,721,506

UNITED STATES PATENT OFFICE.

WILLIAM L. BASS, OF NEW YORK, N. Y., ASSIGNOR TO E. & J. BASS, INC., A CORPORATION OF NEW YORK.

CONVERTIBLE LIQUID CONTAINER.

Application filed April 20, 1926. Serial No. 103,345.

The present invention relates to convertible liquid containers and is more particularly directed toward a convertible container which may be made up in the form of a loving cup, water pitcher, chalice, vase, or similar article, and converted at will to a device for extracting fruit juices or a beverage shaker.

The present invention contemplates the provision of an article, which appears as a loving cup (or as any of the above enumerated articles), and may function as such, either for decorative purposes or for the ordinary functional uses, when the parts are in one position, and having parts which may be moved to other positions to convert the article into a device for extracting fruit juices or beverage shaker, when desired.

According to the present invention, these movable parts are held concealed, or are so mounted that the conversion of the device, or its suitability for use as a beverage shaker, is not obvious from a cursory examination of the article when the parts are in their normal position.

Other and further objects of the invention will be pointed out as the description proceeds.

The accompanying drawings show, for purposes of illustrating the invention, two of the many possible embodiments in which it may take form, it being understood that the drawings are illustrative of the invention which may be embodied in many additional forms.

In these drawings:

Figure 1 is a sectional view through one form of convertible liquid container made up to embody the present invention, the base of the container being in elevation and the parts in section being shown in the position which they assume when the device appears as a loving cup or the like;

Figure 2 is an elevational view of the convertible liquid container of Figure 1, the parts being in the position they assume when the device is used as a beverage shaker; and Figure 3 is a view similar to Figure 1 showing a modified form of loving cup provided with a dome shaped cover normally carried on top of the cup, the position of the parts when used for extracting fruit juices being indicated in dotted lines.

As shown in Figures 1 and 2, the convertible liquid container is in the form of a loving cup having a cup shaped receptacle 40, a base 41 and handles 42. When the container is made up in the form of a water pitcher, chalice, vase, or other article, its general outward shape will of course change in accordance with the usual outline of such articles.

The loving cup is provided with a dome shaped cover member 43 which is adapted to assume the position shown in Figure 2, when it acts as a cover for the loving cup, or to assume the position shown in Figure 1, when it acts as a false bottom for the loving cup. The upper edge of this cover member 43 is preferably provided with a bead or peripheral flange 44 which is adapted to rest on the upper edge 45 of the cup shaped receptacle 40, as indicated in Figure 1 so as to securely carry the false bottom in position inside the loving cup. The cover member extends a short distance beyond this flange as indicated by the skirt 46, so that when the cover member is in the position of Figure 2, the lower end of it may telescope with the upper end of the cup to hold the parts together, forming a liquid tight joint.

When the parts are in the normal position, as shown in Figure 1, one can look into the loving cup from above and will not notice the false bottom formed by the inverted cover 43. The lower end of this false bottom member is, as here shown, drawn into the form of a tube 46' which carries a pouring spout 47. This spout may be held in place by friction, or threaded, or permanently soldered, if desired. This pouring spout has a liquid-tight cap 48. In order that one will not observe the hole made by drawing out the tubular portion 46', there is provided a disc 49 which fits into the false bottom and which is carried in any suitable fashion. A convenient manner of carrying this disc 49 is to provide a shallow recess 50 in the sheet metal cover member 43 which is just the right size to fit the outer edge of the disc 49. This part may then easily be held in place by friction.

A combined lemon squeezer or fruit juice extracting device 51 and strainer 52, is carried below the bottom of the false bottom 43 and the bottom of the receptacle 40. This fruit juice extracting device is made of the proper size to frictionally fit the recess 50 when the disc 49 is removed.

When one desires to extract fruit juice, the cap 48 may be taken off the pouring spout 47, and the disc removed, then the fruit juice extractor and strainer are placed in position, and one can readily extract the fruit juices, allowing them to drain from the spout into the receptacle.

When it is desired to mix the beverage, it is necessary to invert the false bottom 43. The contents may be poured out through the pouring spout, the fruit juice extractor acting as a strainer to prevent the escape of pulp, seeds, ice or the like.

According to the form of the invention illustrated in Figure 3, the cup shaped receptacle 60 is provided with a cover member 61 which is normally intended to be carried in the full line position. This cover member may be provided with a flange or bead 62 similar to the bead 44, and may have a skirt 63 to fit inside the top of the cup, to make a water tight joint. The upper end of the cover member 61 is provided with a short tubular stem or nipple 64 which may carry an ornamental knob, statuette or other device, indicated at 65. This device 65 may be threaded onto the nipple. Across the inside of the cover member 61, and suitably spaced in it, is illustrated a fruit juice extractor and strainer 66 permanently fastened in place in any convenient manner.

When the cover is inverted, as indicated in Figure 3, in dotted lines, one may extract fruit juice by pressing the fruit against the fruit juice extractor 66, allowing it to drain into the bottom of the receptacle. The cover may then be inverted and the device used as a beverage shaker, the beverage being poured through the nipple, which acts as a pouring spout, and being strained as above described.

It is obvious that the invention may be embodied in many forms and constructions, and I wish it to be understood that the particular forms shown are but a few of the many forms. Various modifications and changes being possible, I do not limit myself in any way with respect thereto.

What is claimed is:

A convertible liquid container, comprising, a sheet metal cup-shaped receptacle, a frustro-conical base, a dome-shaped sheet metal cover telescopically fitting inside the upper rim of the receptacle, the cover normally closing the top of the receptacle having a bead to rest on top of the receptacle when the cover is inverted, a short tubular pouring spout of small diameter permanently carried by the top of the dome-shaped cover, an ornamental cap removably carried by and concealing the pouring spout, and a combined fruit juice extractor and strainer placed across the inside of the cover so that fruit may be squeezed against it when the cover is inverted and the juice may be strained into the receptacle, the liquid container resting on the base.

WILLIAM L. BASS.